3,636,146
PREPARATION OF DIALKENYL PHOSPHONATES
Arthur D. F. Toy, Stamford, Conn., assignor to Stauffer Chemical Company, New York, N.Y.
No Drawing. Filed Mar. 24, 1969, Ser. No. 810,026
Int. Cl. C07f 9/40
U.S. Cl. 260—982     7 Claims

ABSTRACT OF THE DISCLOSURE

A procedure for preparing a dialkenyl phosphonate is disclosed, said procedure comprising reacting dimethyl phosphonate and an alkenol in the presence of a non-azeotropic solvent. The use of a solvent which does not form an azeotrope with methyl alcohol, the by-product of the reaction of an alkenol with dimethyl phosphonate, has led to improved product yield and purity as well as an extremely rapid reaction rate.

BACKGROUND OF THE INVENTION

Field of the invention

The present invention relates to a new and improved procedure for preparing a dialkenyl phosphonate by a transesterification reaction involving dimethyl phosphonate and an alkenol. The reaction is suitably conducted in the presence of a non-azeotropic solvent and an alkaline catalyst. The products obtained by the present present process and especially, diallyl phosphonate are useful as intermediates in the preparation of compounds employed as flame retardants as well as phosphorus-containing polymers.

Description of the prior art

One of the earliest known procedures for preparing a dialkenyl phosphonate was disclosed in U.S. Pat. 2,574,516, dated Nov. 13, 1951 (and also disclosed by E. L. Gefter, "Organo Phosphorous Monomers and Polymers," Associated Technical Services Inc. 1962). In this process, allyl alcohol is reacted with phosphorus trichloride and there is obtained as the final product, diallyl phosphonate. However, this process is undesirable and is also unsuitable for large scale production for many reasons; one serious problem involves the use of the corrosive phosphorus trichloride reactant. Another reason which makes this process unsuitable for large scale production is the fact that 3 moles of allyl alcohol are required for each mole of phosphorus trichloride; 1 mole of allyl alcohol is consumed by conversion to allyl chloride as illustrated by the following equation:

$3CH_2=CHCH_2OH + PCl_3 \longrightarrow$

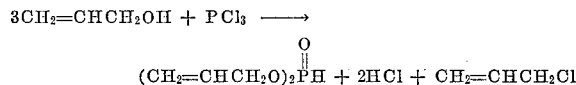

Another disadvantage associated with the process is that in the esterification reaction, HCl is liberated and this results in an inter-reaction whereby other undesirable by-products are obtained. Still a further disadvantage associated with the use of the process for large scale production is that a low yield of the desired product is obtained that is, a yield of only 65.7%.

Another process for the production of a dialkenyl phosphonate is disclosed in French Pat. No. 1,162,199 which was published on Sept. 9, 1958. In this process, diallyl phosphonate is obtained in an ester exchange reaction between allyl alcohol and diethyl or dimethyl phosphonate in the presence of a catalyst and the reaction is conducted either in the presence or in the absence of a solvent. The process appears to be unsuitable for large scale production since good yields are obtained only after a reaction period of twelve hours. In addition, in one of the examples illustrating the preparation of a dialkenyl phosphonate, the use of a catalyst, the metal sodium, is required.

SUMMARY OF THE INVENTION

In accordance with the process of the present invention, a dialkenyl phosphonate is obtained, in high yield, high purity and at an extremely rapid reaction rate, by a simple procedure suitable for large scale production, said procedure involving the transesterification of dimethyl phosphonate and an alkenol. The reaction is generally conducted in the presence of an alkaline catalyst and an essential element in the process is that the process should be carried out in the presence of a non-azeotropic solvent.

The dialkenyl phosphonates are valuable as chemical intermediates as, for example, these compounds will react by addition with alkyl esters of ethylenically unsaturated carboxylic acids, to give dialkenyl phosphonate esters which are polymerizable to hard, glassy, solid resins having self-flame-extinguishing characteristics and other valuable properties. The aforesaid dialkenyl phosphonate esters may also be copolymerized with a number of polymerizable ester compounds such as, for example, methyl methacrylate, vinyl acetate, diallyl phthalate, unsaturated polyesters, etc., to produce hard, solid products having excellent physical properties and self-extinguishing flame characteristics (U.S. Pat. 2,867,610).

Further, the dialkenyl phosphonates obtained by the process of the present invention are also useful in preparing cyanoethane-phosphonates, the last mentioned compounds being useful in the flameproofing of fabrics and may be polymerized to form hard, tough, flame resistant film, coatings and molded solid products (U.S. Pat. 2,844,558).

DETAILED DESCRIPTION OF THE INVENTION

The present invention provides a new and improved procedure for preparing dialkenyl phosphonates by reacting dimethyl phosphonate with an alkenol. Suitable alkenols include, for example, allyl alcohol, methallyl alcohol, and the like. In the present reaction, at least two mols of the alkenol are required for each mol of the dimethyl phosphonate. An excess amount of the alkenol, i.e., a slight excess, at least about 25% up to about 50% is preferred but up to about a 200% excess of the alkenol can be used. However, when an excess amount of the alkenol is used, the excess is not consumed but is recycled, as distinguished from the process disclosed in U.S. Pat. 2,574,516, discussed supra.

The reaction is a simple one which is suitable for large-scale production and the high yield, high purity and the rapid reaction rate are apparently due to the fact that the reaction is conducted in the presence of a non-azeotropic solvent. The reaction is also generally conducted in the presence of an alkaline catalyst.

It was found however, that when diethyl phosphonate was used in the transesterification reaction, in the place of dimethyl phosphonate, as illustrated in one of the examples below, high yields could only be obtained after an extended reaction period, that is, after the reaction was conducted for a period of almost seventeen hours.

As indicated above, an essential requirement for the successful operation of the present process is that the process should be conducted in the presence of a non-azeotropic solvent and particularly, a non-azeotropic solvent boiling between about 120° C. and about 160° C. When the reaction is conducted in the presence of an azeotropic solvent, contrary to the teachings of the prior art that is, French Pat. 1,162,199 referred to above, good yields could only be obtained after an extended reaction period. Suitable non-azeotropic solvents include, for example, xylene (i.e., m-, o- and p-xylene), ethylbenzene, chlorobenzene, cumene, and the like, and such solvents are used in amounts equal to about the total amounts of the dimethyl phosphonate and alkenol reactants used in the process. Larger amounts of the non-azeotropic solvent can be used but would appear to offer no practical advantage.

The reaction is generally conducted in the presence of an alkaline catalyst and suitable alkaline catalysts include alkali metal hydroxide, alkali metal alkoxides, alcoholates and phenolates. Typical alkali metal hydroxides are sodium or potassium hydroxide; suitable alkali metal alkoxides are sodium methoxide, potassium methoxide, and the like; suitable alkali metal alcoholates or phenolates include potassium butylate, sodium methylate, potassium phenolate, sodium allylate, and the like. The catalyst is used in amounts ranging between about 0.001 and 0.20 mol for each mol of dimethyl phosphonate.

The following examples illustrate the process of the present invention but the invention is not to be restricted thereto.

EXAMPLE I 99 grams (0.9 mole) of dimethyl phosphonate was mixed with 156 grams (2.7 mole) of allyl alcohol, 240 cc. xylene and 1.2 grams of sodium methoxide. The mixture was heated to reflux and the methanol formed was distilled off along with some of the allyl alcohol and xylene. The progress of the reaction was followed by periodically taking samples of the reaction mixture and analyzing it by means of gas chromatography. After three and three-quarter hours of heating, 89% of the diallyl phosphonate had been formed. After five hours and 25 minutes, 100% of the diallyl phosphonate had been formed. The reaction product, upon fractional distillation, gave a yield of diallyl phosphonate which is equivalent to 86% based on the original dimethyl phosphonate used.

It should be noted that while an excess amount (3 moles) of allyl alcohol is used, the one mole in excess is not consumed but is recycled and is again available.

EXAMPLE II

To illustrate the special suitability of dimethyl phosphonate in the preparation of the desired dialkenyl phosphonate, the procedure of Example I was repeated except for the fact that 0.3 mol of diethyl phosphonate was used to replace the 0.3 mol of dimethyl phosphonate used. Again, the progress of the reaction was followed by gas chromatographic analysis. Upon heating the reaction mixture and distilling off the ethyl alcohol formed along with some allyl alcohol and xylene, after thirteen hours, only 89.5% of the reaction was completed. After sixteen and three-quarter hours, 95.2% of the reaction was completed. The reaction mixture, upon fractional distillation, gave a yield of 64% of diallyl phosphonate.

EXAMPLE III

The trans-esterification reaction between dimethyl phosphonate and allyl alcohol was carried out using toluene as the solvent. Toluene, in contrast to xylene used in Example I, forms an azeotrope with methanol. Xylene does not form an azeotrope with methanol. In this example, 33 grams (0.3 mol) of dimethyl phosphonate, 52 grams (0.9 mol) of allyl alcohol, 80 cc. of toluene and 0.4 gram of sodium methylate were used. The reaction mixture, after heating and distilling off the methanol along with some allyl alcohol and toluene, showed that after thirteen hours, only 78.2% of the reaction was completed as indicated by the gas chromatographic analysis of the reaction mixture of diallyl phosphonate and monoallyl monomethyl phosphonate. After 23 hours, only 92% of the reaction was completed. This example shows that the reaction is slowed down considerably when toluene in place of xylene was used as the solvent for the reaction. Such slowness of reaction is obviously undesirable from a commercial point of view.

EXAMPLE IV

The transesterification reaction between dimethyl phosphonate and allyl alcohol was carried out in the absence of a non-azeotropic solvent but using approximately 100% excess of allyl alcohol, i.e., 22 grams of dimethyl phosphonate, 45.2 grams of allyl alcohol and 0.5 gram of sodium methylate were added together and the mixture heated to distill off the methanol formed along with some of the excess allyl alcohol. Gas chromatographic analysis showed that only 81% of diallyl phosphonate was formed after heating for thirteen hours. This example again illustrates the importance of carrying out the transesterification reaction between dimethyl phosphonate and allyl alcohol in the presence of a non-azeotropic solvent.

EXAMPLE V

Following the procedure described in Example I supra except for the use of ethylbenzene instead of xylene as the non-azeotropic solvent, the desired diallyl phosphonate product was obtained in a comparable yield and period of time, as in Example I.

EXAMPLE VI

Following the procedure described in Example I supra except for the replacement of allyl alcohol by methallyl alcohol, dimethallyl phosphonate was obtained in a comparable yield and period of time, as in Example I.

The invention has been described with respect to certain preferred embodiments and various modifications. Variations thereof will become obvious to persons skilled in the art. It is therefore to be understood that such modifications and variations are to be included within the spirit and scope of this invention.

I claim:
1. A process for the preparation of a dially phosphonate which comprises:
   (a) admixing an alkenol selected from the group consisting of allyl alcohol and methally alcohol with dimethyl phosphonate in a non-azeotropic solvent selected from the group consisting of xylene, ethylbenzene, chlorobenzene and cumene, said alkenol being added in at least a 2:1 molar ratio to said dimethyl phosphonate and said solvent being present in an amount at least equal to the total amount of dimethyl phosphonate and alkenol used;
   (b) heating the mixture of step (a) at the reflux temperature; and
   (c) separating the diallyl phosphonate from the reaction product.

2. The process of claim 1 wherein the non-azeotropic solvent additionally contains from about 0.001 to about 0.20 mole of an alkaline catalyst per mole of dimethyl phosphonate, said catalyst being selected from the group consisting of alkali metal hydroxides, alkali metal alkoxide, alkali metal alcoholates and alkali metal phenolates.

3. A process according to claim 2 wherein the non-azeotropic solvent is xylene.

4. A process according to claim 2 wherein an excess of allyl alcohol is used in the reaction.

5. A process according to claim 2 wherein at least about a 25% excess of allyl alcohol is used in the reaction.

6. A process according to claim 2 wherein diallyl phosphonate is obtained by reacting dimethyl phosphonate with allyl alcohol in the presence of xylene.

7. A process according to claim 6 wherein about a 50% excess of allyl alcohol is used in the reaction.

References Cited

UNITED STATES PATENTS 3,268,630  8/1966  Spivack _____ 260—982 X

FOREIGN PATENTS 1,162,199  9/1958  France _____ 260—982

CHARLES B. PARKER, Primary Examiner

R. L. RAYMOND, Assistant Examiner

U.S. Cl. X.R.

252—8.1; 260—940, 956